United States Patent

[11] 3,627,258

[72] Inventor Domer Scaramucci
3245 S. Hattie, Oklahoma City, Okla. 73129
[21] Appl. No. 881,988
[22] Filed Dec. 4, 1969
[45] Patented Dec. 14, 1971
Continuation-in-part of application Ser. No. 763,644, Sept. 30, 1968, now Patent No. 3,531,081. This application Dec. 4, 1969, Ser. No. 881,988

[54] PLUG-TYPE VALVE ASSEMBLY
10 Claims, 3 Drawing Figs.
[52] U.S. Cl. .................................................. 251/152, 251/309, 137/454.2
[51] Int. Cl. .................................................. F16k 5/02, F16k 51/00
[50] Field of Search .......................................... 251/148, 151, 152, 291, 292, 308, 309, 315, 367; 137/454.2

[56] References Cited
UNITED STATES PATENTS
| | | | |
|---|---|---|---|
| 2,092,261 | 9/1937 | Rector | 251/291 X |
| 2,995,336 | 8/1961 | Usab | 251/315 X |
| 3,362,433 | 1/1968 | Heinen | 251/309 X |
| 3,380,706 | 4/1968 | Scaramucci | 251/148 |
| 3,516,688 | 6/1970 | Gachot | 137/454.2 X |

Primary Examiner—William R. Cline
Attorney—Dunlap, Laney, Hessin & Dougherty

ABSTRACT: A valve assembly, particularly useful between flanges and in high-temperature applications, which utilizes a housing unit and a separate insertable valve unit. The housing unit provides a support housing adapted to be supported between the flanges and includes a valve operator and a valve stem. The valve unit includes a valve member and a valve body and is sized to be inserted lengthwise into the housing unit and is supported therein. The valve member has a portion thereof adapted to be interconnected to the valve stem, so the valve member may be rotated from a fully open to a fully closed position.

INVENTOR
DOMER SCARAMUCCI

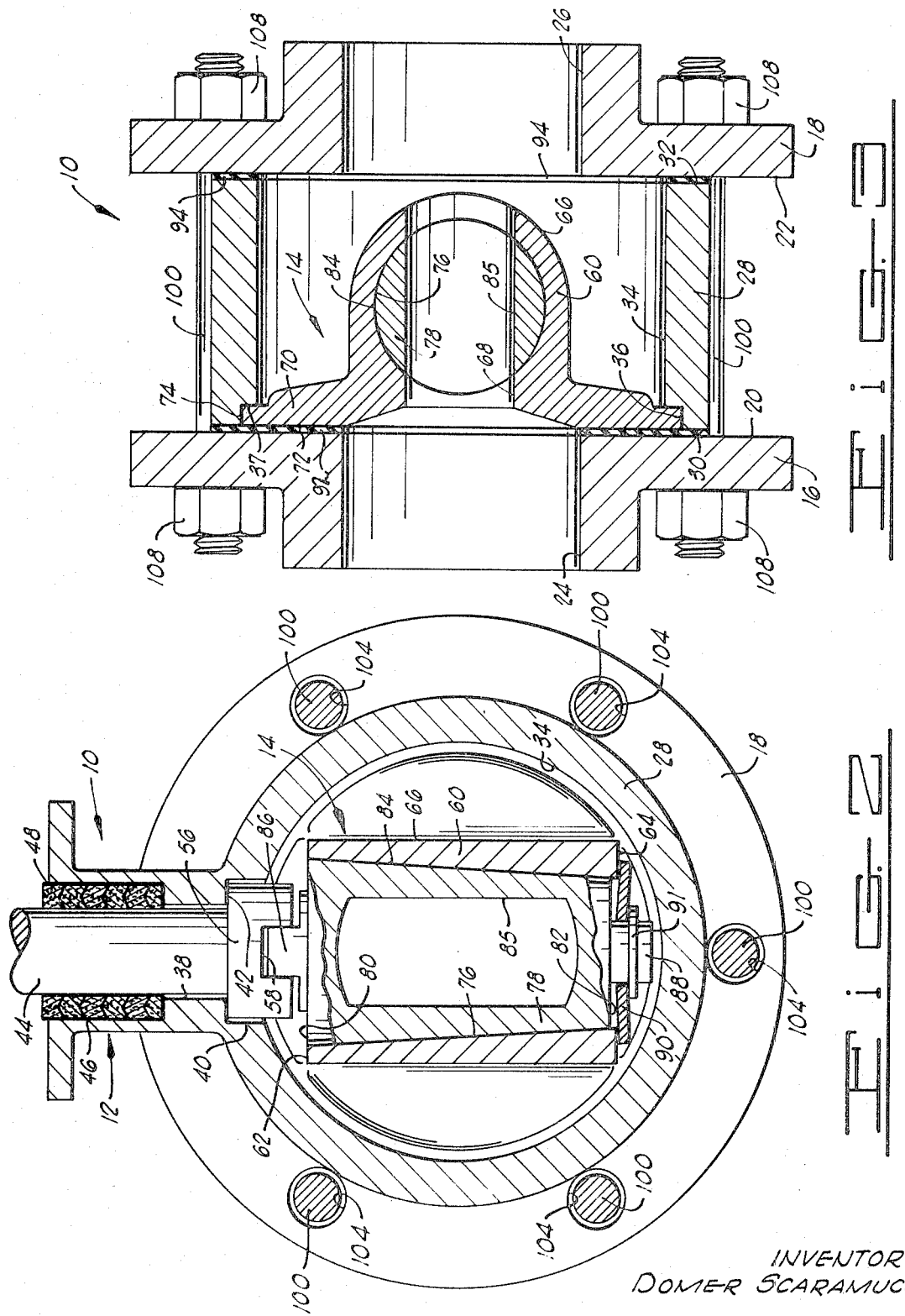

PLUG-TYPE VALVE ASSEMBLY

CROSS-REFERENCE TO RELATED APPLICATIONS

This application is a continuation-in-part of applicant's copending application entitled "Valve Assembly with Insertable Valve Unit," Ser. No. 763,644, filed Sept. 30, 1968, now U.S. Pat. No. 3,531,081; and related subject is disclosed in the applicant's copending applications "Reciprocating Valve Assembly," filed Apr. 18, 1969, Ser. No. 817,497, now U.S. Pat. No. 3,521,666, issued July 28, 1970; and "Butterfly Valve Assembly," Ser. No. 818,185, filed Apr. 17, 1969, now U.S. Pat. No. 3,531,082, issued Sept. 29, 1970.

BACKGROUND OF INVENTION

1. Field of Invention

This invention relates generally to improvements in valve assemblies utilizing a housing unit and a separate valve unit, and more particularly, but not by way of limitation, to an improved plug-type valve assembly utilizing a housing unit and a separate valve unit.

2. Description of the Prior Art

In many applications, such as those involving the handling of fluids, the temperature of which is relatively high, special sealing considerations and elements are generally required. During the repair of such valve assemblies in the past, it has generally been necessary to remove the valve stem, so the valve member and seats could be removed for replacement or repair. This procedure many times resulted in damage of the seal between the valve stem and the valve body, and in many instances the valve stem was replaced leaving the defective stem seals in the valve assembly.

In such high-temperature applications, it is generally desirable to provide a metal-to-metal seal between the valve body and the valve member. Because of practical machining tolerances, a valve member did not always seatingly mate with a particular valve body in such a manner that the required sealing integrity therebetween was practically achieveable. The sealing integrity between the valve member and the valve body was even more difficult to maintain when it became necessary to replace a particular valve member, and in some instances this necessitated a complete replacement of the entire valve assembly.

SUMMARY OF THE INVENTION

The present invention contemplates a valve assembly for controlling the flow of fluid through adjacent pipe sections. The valve assembly includes a housing supported between the adjacent ends of the pipe sections, having opposite end faces and a bore extending therethrough. A valve stem is journaled in the housing and has an upper and a lower end portion. The lower end portion of the valve stem projects into the housing bore. A valve operator is supported by the housing and is connected to the upper end portion of the valve stem to rotate the valve stem in the housing. The valve assembly also includes a valve unit having a valve body which is adapted to be inserted lengthwise into the housing and supported therein. The valve body has a bore extending axially therethrough, and an aperture extending transversely therethrough intersecting the bore in the valve body. A valve member is seatingly supported in the aperture of the valve body for opening and closing the valve assembly. A stem connector is formed on a portion of the valve member and is sized and disposed to interconnect the valve member and the valve stem. The valve member is thus rotated from the fully open to a fully closed position as the valve stem is rotated by the valve operator.

An object of the invention is to facilitate the repair of valve assemblies in the field.

Another object of the invention is to provide a plug-type valve assembly wherein the valve member and seats are removable and replaceable as a unit.

A further object of the invention is to provide a plug-type valve assembly wherein the valve seat and valve member may be removed without having to remove the valve operator or valve stem.

A still further object of the invention is to provide a plug-type valve assembly wherein the sealing integrity of the stem seal is maintained during repair or replacement of the valve member or seats.

One additional object of the invention is to provide a plug-type valve assembly which may be economically manufactured, repaired in the field in a minimum amount of time, and will have a long service life.

Other objects and advantages of the invention will be evident from the following detailed description when read in conjunction with the accompanying drawings which illustrate the preferred embodiment of the invention.

BRIEF DESCRIPTION OF THE DRAWINGS

FIG. 2 is a sectional view of a portion of the valve assembly of FIG. 1, taken substantially along the lines 2—2 of FIG. 1.

FIG. 3 is a sectional view of the valve assembly of FIG. 1, taken substantially along the lines 3—3 of FIG. 1.

DESCRIPTION OF THE PREFERRED EMBODIMENT

Figure 1:
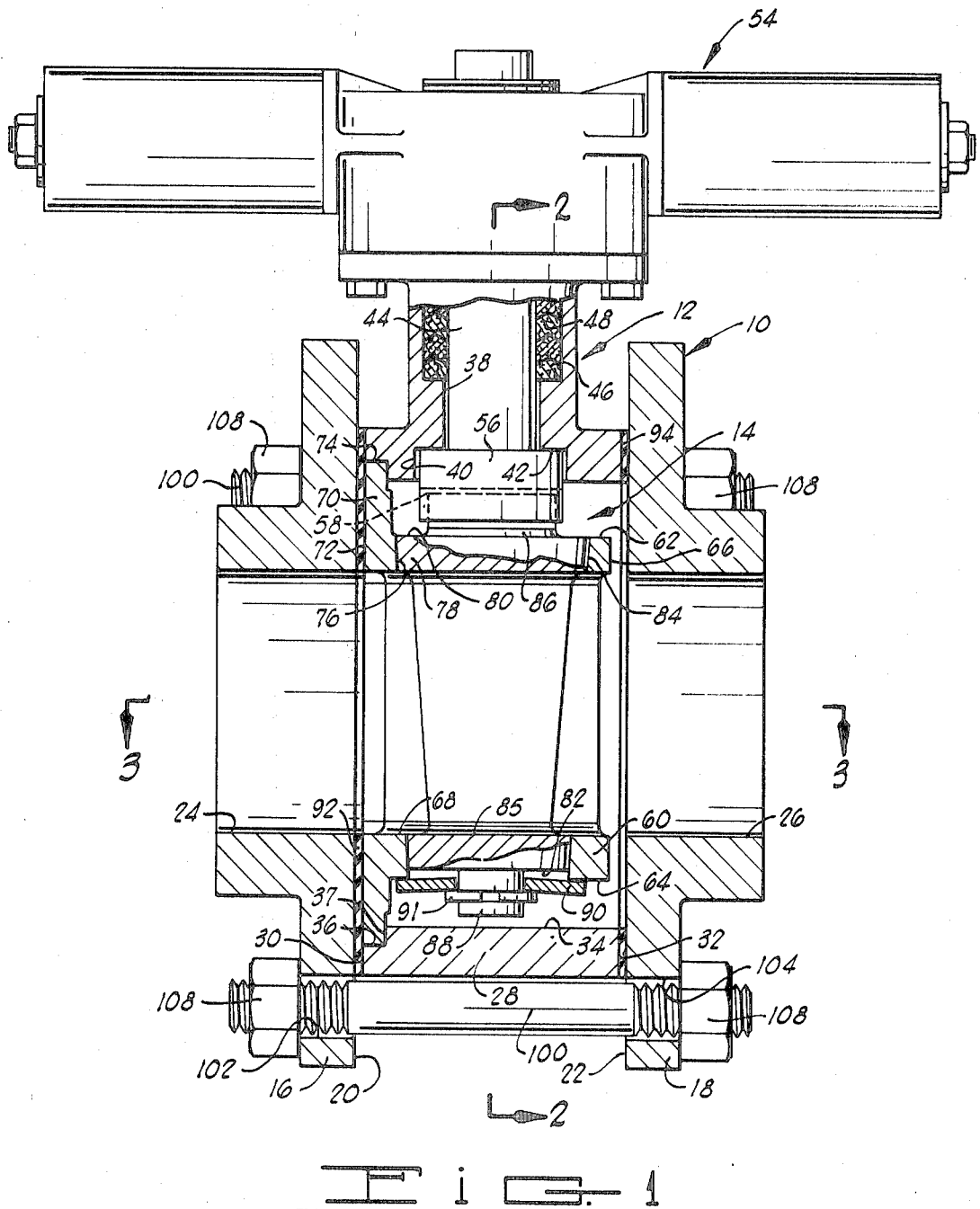
FIG. 1 is a partial sectional, partial elevational view of a valve assembly.

Referring to the drawings in detail, and to FIG. 1 in particular, shown therein and designated by the general reference character 10 is a valve assembly basically comprising a housing unit 12 and a valve unit 14.

The valve assembly 10 is disposed generally between a pair of flanges 16 and 18. Each of the flanges 16 and 18 includes an end face 20 or 22, and an opening 24 or 26 respectively. The openings 24 and 26 are axially aligned and sized to mate with the adjacent ends of adjacent sections of a conduit (not shown).

The housing unit 12 includes a tubular housing 28 having opposite end faces 30 and 32, and a bore 34 extending therethrough intersecting the end faces 30 and 32. A counterbore 36 is provided in the bore 34 of the housing 28, and intersects the end face 30 thereof. The counterbore 36 forms an annular wall 37 in the housing 28 facing in the same direction as the end face 30.

An aperture 38 extends transversely through the housing 28 intersecting the bore 34. A counterbore 40 is formed in the aperture 38, generally adjacent the bore 34. The counterbore 40 is of a larger diameter than the aperture 38, thereby providing a downwardly facing surface 42 in the housing 28, encircling the aperture 38.

A valve stem 44 extends through and is journaled in the aperture 38. Thus, the center line of the valve stem 44 extends generally at a right angle to the center line of the bore 34 of the housing 28. A recess 46 is formed in the housing 28 generally adjacent and intersecting an uppermost end portion of the aperture 38. The recess 46 is sized to receive a high-temperature seal packing 48, such as asbestos, which is disposed therein.

The upper portion (not shown) of the valve stem 44 is adapted to be connected to a valve operator 54. The valve operator 54 is adapted to rotate the valve stem 44 in the aperture 38. As well known in the art, various forms of valve operators are available to perform this particular function. In one form, for example, the valve operator 54 could be of the type generally described in U.S. Pat. No. 3,338,140, or of the type described in U.S. Pat. No. 3,218,024. This form of valve operator 54 would rotate the valve stem 44 in response to a control signal, which is fed to the valve operator 54 through appropriate connectors. It is apparent that other types of operators may also be utilized to perform the function of rotating the valve stem 44.

The valve stem 44 also includes a lower flange portion 56 which is sized to engage the downwardly facing surface 42, thereby limiting the upward movement of the valve stem 44 in the aperture 38. A slot 58 is formed in the flange portion 56, for reasons to be made more apparent below. The engagement of the flange portion 56 with the downwardly facing surface 42 forms a secondary metal-to-metal sealing engagement between the valve stem 44 and the housing 28.

As shown more clearly in FIGS. 2 and 3, the valve body 60 is basically cylindrically shaped, having an upper and a lower end 62 and 64 and an outer periphery 66. A bore 68 is formed horizontally through the valve body 60 in alignment with the openings 24 and 26 of the flanges 16 and 18.

A circumferential flange 70 is formed on a portion of the outer periphery 66 of the valve body 60, and extends generally radially from one of the openings formed by the bore 68. The flange 70 extends approximately the same radial distance from the valve body 60 around the entire circumference thereof, thereby supporting the valve body 60 centrally in the housing bore 34. The flange portion 70 has an end face 72 and an outer periphery 74. The outer periphery 74 is sized to slidingly and matingly fit into the counterbore 36 of the housing 28.

In the assembled position, the valve body 60 is inserted in the housing bore 34 to a position wherein the flange 70 abuts the annular wall 37 formed in the housing 28, thereby limiting the inward axial movement of the valve body 60 in the housing 28. In this position, the end face 72 of the flange 70 is coplanar with the end face 30 of the housing 28. The length of the valve body 60 generally between the opposite ends 62 and 64 thereof is less than the diameter of the bore 34, so that the valve body 60 is supported in a central portion of the housing bore 34, and, therefore does not contact the housing 28 when the valve body 60 is placed in the assembled position.

A tapered aperture 76 is formed transversely through the valve body 60, intersecting the opposite ends 62 and 64 and a portion of the bore 68 in the valve body 60. More particularly, the aperture 76 is tapered such that the diameter thereof generally adjacent the end 62 of the valve body 60 is greater than the diameter thereof generally adjacent the end 64 of the valve body 60, for reasons to be made more apparent below.

The tapered aperture 76 is sized to matingly and seatingly receive a plug-type valve member 78 which is rotatably disposed therein. The valve member 78 in generally cylindrically shaped, and has opposite ends 80 and 82 and an outer periphery 84. A flow port 85 extends transversely through the valve member 78, generally between the opposite ends 80 and 82 thereof, intersecting the outer periphery 84 at opposite sides of the valve member 78.

As shown more clearly in FIGS. 1 and 2, the outer periphery 84 of the valve member 78 is tapered, such that in the assembled position the outer periphery 84 matingly and seatingly engages the adjacent wall portions of the valve body 60 formed by the aperture 76. It is apparent from the foregoing that the taper of the aperture 76 of the valve body 60 is sized to cooperate with the taper of the outer periphery 84 of the valve member 78, to limit the downward movement of the valve member 78 in the aperture 76.

In another form, the aperture 76 in the valve body 60 could be cylindrically shaped, thereby eliminating the taper, and the outer periphery 84 of the valve member 78 could be correspondingly shaped to matingly fit therein. In this form, a retaining device would be required to limit the downward movement of the plug valve member 78 in the aperture 76.

A stem connector 86 is formed on a portion of the upper end 80 of the valve member 78. The stem connector 86 is rectangularly shaped and sized to interconnectingly fit in the slot 58 of the valve stem 44 when the valve unit 14 is in the assembled position. In the assembled position, the stem connector 86 extends radially from the valve body 78, generally beyond the end 62 of the valve body 60.

A boss 88 is formed on a portion of the lower end 82 of the valve member 78, and extends beyond the end 64 of the valve body 60. A retaining ring 90 is secured about the boss 88 by a clip 91. The retaining ring 90 is sized to engage a portion of the lower end 64 of the valve body 60, thereby limiting the upward movement of the valve member 78 in the valve body 60.

A seal gasket 92, which may be constructed of an asbestos-type material, is disposed between the end face 72 of the flange 70 and end face 20 of the flange 16, thereby forming a fluidtight seal therebetween. A second seal gasket 94, which may also be constructed of an asbestos-type material, is disposed between the end face 32 of the housing 28 and the end face 22 of the flange 18, thereby forming a fluidtight tight seal therebetween.

The housing unit 12, the valve unit 14, and the flanges 16 and 18 are held in an assembled relationship by a plurality of bolts 100. Each bolt 100 extends through an aperture 102 in the flange 16, about the outer periphery of the housing 28, and through an aperture 104 in the flange 18. Each of the bolts 100 is provided with a pair of threaded nuts 108 that engage the flanges 16 and 18.

OPERATION

The valve unit 14 and the housing unit 12 are combined to form the valve assembly 10 by first inserting the valve stem 44 upwardly through the aperture 38 of the housing 28. The valve operator 54 is then connected to the valve stem 44, such that on a given response the valve operator 54 will cause the valve stem 44 to rotate within the aperture 38. The turning movement of the valve stem 44 is transmitted to the valve member 78 via the interconnection therebetween.

The valve member 78 is then inserted downwardly through the tapered aperture 76 in the valve body 60 to a position wherein the outer periphery 84 of the valve member 78 seatingly engages the adjacent portions of the wall formed in the valve body 60 by aperture 76. As shown more clearly in FIGS. 1 and 2, the valve member 78 is thus rotatingly supported in the valve body 60. The valve unit 14 is then inserted lengthwise into the housing unit 12, to a position wherein the rectangularly shaped stem connector 86 is disposed in the slot 58 of the valve stem 44, thereby providing the interconnection therebetween.

In the normal operation of the valve assembly 10 the fluid will flow in a direction generally from the opening 24 of the flange 16 through the flow port 85 of the valve member 78 and out through the opening 26 of the flange 18. As shown in FIGS. 1, 2 and 3, the valve member 78 is in the open position, that is, a position wherein the flow port 85 is aligned with the bore 68 through the valve body 60. When the valve member 78 has been rotated to the closed position, that is, a position wherein the flow port 85 through the valve member 78 is turned at a right angle to that shown in FIGS. 1, 2 and 3, the outer periphery 84 of the valve member 78 will seatingly and sealingly engage the wall formed in the valve body 60 by the aperture 76, thereby forming a fluidtight seal therebetween and preventing the flow of fluid through the valve assembly 10.

It is apparent from the foregoing, that the valve assembly 10 provides a valve assembly wherein the valve unit and the housing unit are separate and interchangeable components. The valve body has seating surfaces formed therein to seatingly and sealingly engage the valve member. The valve member is supported in the valve body in such a manner that the valve unit, including the valve member, can be inserted lengthwise into the housing unit. The valve unit may therefore be quickly and easily removed or installed in a given housing unit, thereby facilitating the field repair of the valve.

The valve unit can thus be removed and repaired or replaced without the necessity of having to remove the valve stem 44 or the valve operator. Therefore, the stem packing 46 is not disturbed during the repair or replacement of the valve unit 14, thereby maintaining the sealing integrity of the stem seal during this operation.

It is also important to note that since the valve unit 14 is constructed as a separate unit, the valve member and the valve body can be matingly sized prior to their insertion into the valve assembly 10, thereby minimizing the sealing problems therebetween.

Changes may be made in the construction and arrangement of the parts or the elements of the invention as disclosed herein without departing from the spirit and scope of the invention as defined in the following claims.

What is claimed is:

1. A valve assembly for controlling the flow of fluid through adjacent pipe sections, comprising:

a housing unit, including:
   a housing having opposite end faces and a bore extending therethrough;
   means for supporting the housing between adjacent ends of the pipe sections;
   a valve stem journaled in the housing having an upper and lower end portion, the lower end portion projecting into the housing bore;
   valve-operating means supported by the housing and connected to the upper end portion of the valve stem to rotate the valve stem stem in the housing; and
a valve unit including:
   a cylindrically shaped valve body having opposite ends and a flow port extending therethrough, a tapered aperture extending through the valve body at a right angle to and intersecting the flow port, the aperture intersecting the opposite ends of the valve body and tapering from a larger diameter to a smaller diameter forming a seating surface in the valve body, the valve body being of a size to be inserted lengthwise into the housing bore; means for supporting the valve body in the housing bore;
   a generally cylindrically shaped valve member having a tapered outer periphery supported in the aperture of the valve body for opening and closing the valve assembly, the valve member outer periphery seatingly engaging a portion of the seating surface in the valve body, the seating surface limiting the movement of the valve member in one direction; and
   a stem connector formed on a portion of the valve member and being sized and disposed to interconnect the valve member and the valve stem when the valve body and the valve member are inserted into the housing bore, whereby the valve member is rotated from a fully open to a fully closed position as the valve stem is rotated by the valve operating means.

2. The valve assembly of claim 1 wherein the stem connector is rectangularly shaped; and wherein the lower end portion of the valve stem is further defined to include a slot shaped and disposed to interconnectingly receive the rectangular end of the stem connector.

3. The valve assembly of claim 1 further defined to include a retaining means connected to a portion of the valve member, the retaining means being sized and disposed to engage one end of the valve body, thereby limiting the movement of the valve member in the aperture of the valve body in one direction.

4. The valve assembly of claim 1 wherein the means supporting the housing between the adjacent ends of the pipe sections is further defined to include:
   a flange at each end of the valve assembly adapted to be connected to the respective pipe section, each of said flanges having an end face facing the valve assembly; and
   a plurality of circumferentially spaced bolts extending through each of the flanges respectively and about the outer periphery of the housing.

5. The valve assembly of claim 4 wherein the means supporting the valve body in the housing, includes:
   a flange portion formed on the valve body, said flange portion forming an end face surface about the valve body and being sized to contact the housing and the end face of one of the flanges, and to cooperate therewith to support the valve body in the housing.

6. The valve assembly of claim 5 further defined to include a seal gasket disposed between the end face of the flange portion, the respective end face of the housing, and the respective end face of one of the flanges, thereby forming a fluidtight seal therebetween.

7. The valve assembly of claim 5 wherein the flange portion of the valve body extends approximately the same radial distance from the valve body around the entire circumference thereof, thereby positioning the valve body centrally in the bore of the housing.

8. The valve assembly of claim 5 wherein the housing includes a counterbore adjacent one end thereof; and wherein the flange portion on the valve body is shaped to matingly fit into said counterbore, thereby positioning the valve body in the housing.

9. The valve assembly of claim 8 defined further to include a seal gasket disposed between the end face of the housing opposite the end face thereof having the counterbore therein, and the end face of the adjacent flange, thereby forming a fluidtight seal therebetween.

10. The valve assembly of claim 1 further defined to include a seal means supported in the housing, said seal means being sized and shaped to sealingly engage a portion of the valve stem about the entire periphery thereof.

* * * * *